United States Patent [19]

Hsu

[11] 4,212,237
[45] Jul. 15, 1980

[54] AUTOMATIC ASPARAGUS PEELING MACHINE

[76] Inventor: Tauan-Yuan Hsu, No. 1-2 North Ta-Wan, Yung Kang Hsiang, Tainan Hsien, Taiwan, Taiwan

[21] Appl. No.: 938,218

[22] Filed: Aug. 30, 1978

[51] Int. Cl.$^2$ ............................................. A23N 7/04
[52] U.S. Cl. ...................................... 99/589; 99/536; 99/591
[58] Field of Search .................. 99/536, 546, 584, 585, 99/588, 589, 591, 643; 198/773, 626; 83/368

[56] References Cited

U.S. PATENT DOCUMENTS

| | | | |
|---|---|---|---|
| 1,872,889 | 8/1932 | Champlin et al. | 99/643 |
| 2,262,607 | 11/1941 | Hoon | 99/643 |
| 3,273,618 | 9/1966 | Flodin | 99/643 |
| 3,554,247 | 1/1971 | Larsen | 83/368 |
| 3,923,143 | 12/1975 | Green | 198/773 |

FOREIGN PATENT DOCUMENTS

| | | | |
|---|---|---|---|
| 217967 | of 1908 | Fed. Rep. of Germany | 99/588 |
| 2045900 | of 1972 | Fed. Rep. of Germany | 99/589 |
| 2332350 | of 1975 | Fed. Rep. of Germany | 99/591 |

*Primary Examiner*—Harvey C. Hornsby
*Assistant Examiner*—Timothy F. Simone

[57] ABSTRACT

A completely automatic asparagus peeling machine comprises a material feeding means vibrating with high frequency, a parallel guide means, a conveying means and an automatic peeling assembly.

The material feeding means with its high frequency vibration permits a heap of asparagus to successively fall down on a parallel guide means, and asparagus moves forward therefrom successively one at a time by means of the upward and downward movement of the parallel plates in the parallel guide means until dropping on the conveyor belt of a conveying means, thereby advancing to the inlet opening of an automatic peeling assembly for proceeding automatic peeling operation.

8 Claims, 5 Drawing Figures

AUTOMATIC ASPARAGUS PEELING MACHINE

BACKGROUND OF THE INVENTION

This invention relates to a completely automatic asparagus peeling machine operated by a highly effective combination of constructions, thereby calling for a single operator only to operate two to four peeling machines constructed in accordance with the present invention.

The difficulty with most conventional asparagus peeling machine is that operators must point the end tip of asparagus one at a time to a clamping means for mechanical peeling, thereby generating unfavourable problems such as waste of man power, limited efficiency of production and easiness of producing broken asparagus, thus causing a great increase in production cost which is of a great disadvantage especially at the present time when costs of labor and raw materials are sharply increasing. Besides, two to four operators are needed for operating a single conventional peeling machine.

There are four reasons why conventional peeling machines are not completely automated: In the first place, asparagus can not advance successively one at a time with end tip in the same direction into a peeling means; in the second place, there are differences in size and in shape among asparagus and furthermore asparagus is so brittle that it can not be automatically sent to a clamping means for peeling; in the third place, such a machine is too complicated and too expensive; in the fourth place, the tip end of asparagus must not generally be peeled to avoid damage and only the body of asparagus peeled, thus making its automation practically impossible.

SUMMARY OF THE INVENTION

In view of the foregoing, the main object of the invention is to provide a completely automatic asparagus peeling machine so that productivity by a single man may be achieved thereby reducing production cost and offering a great deal of advantage to the public.

Another object of the present invention is to provide a completely automatic asparagus peeling machine for eliminating such operations of conventional peeling machine as requiring operators to manually correct the flow direction of asparagus and for replacing the manual operation with automation to reduce both the chance of accidents to operators and the chance of damages to the machine by the accidents. Another important object of the present invention is to provide a simple, inexpensive and highly efficient automatic asparagus peeling machine.

Other and further objects, features and advantages of the invention will become apparent from the following description with reference to the drawings.

DETAILED DESCRIPTION OF THE PREFERRED EMBODIMENT

Figure 1:
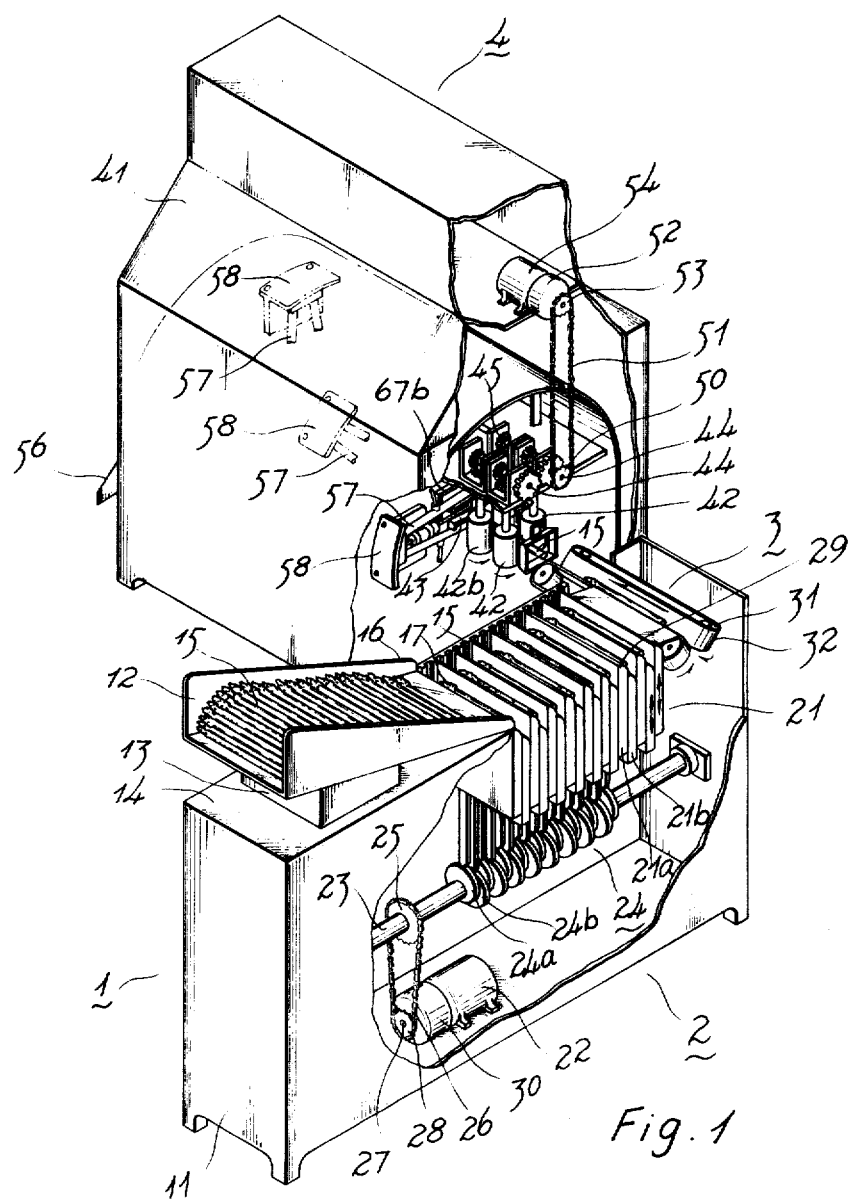
FIG. 1 is a partially sectional view of an embodiment in accordance with the invention.

FIG. 1 is a partially sectional view of an embodiment in accordance with the invention comprising a material feeding means 1, a parallel guide means 2, a conveying means 3, and an automatic peeling assembly 4.

The material feeding means 1 comprises a bottom body 11, a tapered feeding guideway 12 and a vibrating box 13. The bottom body 11 is surrounded by four walls for aesthetic and supporting purposes wherein many concave guideways 17 are provided at proper positions on the inside surfaces of the opposite walls. On the upper surface 14 of the bottom body 11, there is provided a vibrating box 13 driven by conventional eccentric cams, or by any simple mechanical means, or by any electrical means to produce a vibrating effect. On the upper surface of the vibrating box 13, there is provided a tapered feeding guideways 12 which vibrates as the vibrating box 13 vibrates upward and downward with high frequency to gradually advance the asparagus piled thereon in the downward direction until the asparagus falls successively on the upper end of the parallel plates 21 of the parallel guide means 2 located below the end 16 of the tapered feeding guideway 12. In the present embodiment, the end tips of asparagus 15 placed on the tapered feeding guideway 12 are headed in the same direction as the moving direction of a conveying belt. The inclining angle of the tapered guideway 12 in this embodiment is approximately 15° and the vibration frequency of the vibrating box is approximately 3600 cycles per minute. This kind of feeding means, can be readily constructed by those who are familiar with mechanical engineering and is not a feature the present invention, thus will not be described further in detail.

Parallel guide means 2 comprises many parallel plates 21 arranged closely in a row, a motor 22 and a transmission axle 23 having some eccentric cams 24, wherein the odd-numbered convex wheels 24a are formed in the same eccentric position and the even-numbered 24b in a different eccentric position. Furthermore, the odd-numbered parallel plates 21a are meshed respectively with the corresponding odd-numbered convex wheels 24a located therebelow; and the even-numbered parallel plates 21b are meshed respectively with the corresponding even-numbered convex wheels 24b located therebelow. On one end of transmission axle 23, there is provided a chain wheel 25 which is connected by means of a chain 26 therefrom to the chain wheel 28 mounted on the spindle axis 27 of speed reducing means 30. When the motor 22 operates to rotate the transmission axle 23, the even-numbered parallel plates 21b and the odd-numbered parallel plates 21a in turn make upward and downward movement. In other words, the odd-numbered convex wheels 24a and the even-numbered convex wheels 24b are so constructed that when the odd-numbered parallel plates 21a move upward, the even-numbered parallel plates 21b move downward in the opposite direction. As the upper end of all parallel plates 21 are formed into a tapered spherical curvature in the forward direction, asparagus advances one after another thereon and falls successively on the belt of conveying means 3 located below the end of the parallel plates. Both sides of each parallel plate 21 are guided in the concave guideways 17 installed on the inside surface of the bottom body 11, thus the parallel plates 21 making stable, upward and downward motion respectively along the concave guideways 17.

In this embodiment, the rotating of chain wheel 28 mounted on speed reducing spindle axis 27 is approximately 1000 RPM, and the rotating speed of transmission axle 23 driven by the chain 26 is approximately 240 RPM. Simultaneously, when the odd-numbered parallel plates 21a move downward to the lowest position, the difference of distance therebetween is approximately one inch. As the transmission axle can employ a conventional bearing support, it will not be detailed hereinafter.

A conveying means 3 comprises two sets of conveying cylindrical rollers 31 and conveying belts 32 formed into a V-shape. On one end of the cylindrical rollers 31 is installed a driving motor (not shown in the annexed drawing) which drives the belts 32 to rotate continuously in the direction of an arrow, thereby conveying asparagus successively one at a time to the inlet opening of automatic peeling assembly 4. In this embodiment, the angle between the belts is approximately 70° to 90°.

An automatic peeling means 4 comprises an enclosure 41, several clamp type oscillating arm cylindrical rollers 42, movable clamp type knife tools operatively coupled with the cylindrical rollers 42 and the two transmission axles 44.

Figure 3:
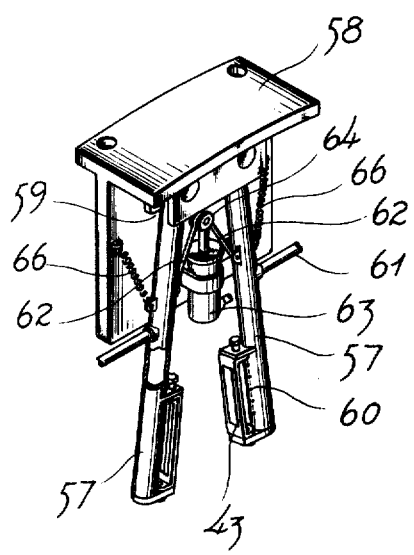
FIG. 3 is a partially enlarged sectional view of constructional relations of the knife tools assembly as shown in FIG. 1.
Figure 2:
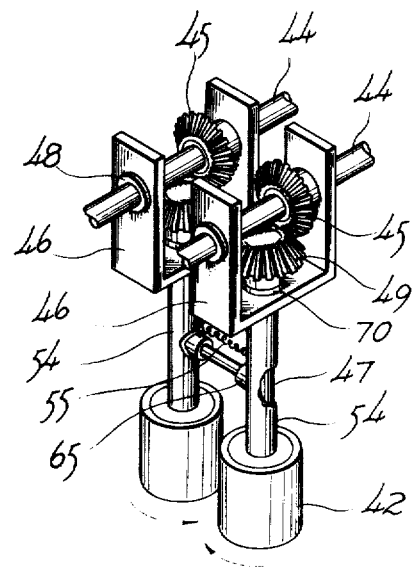
FIG. 2 is a partially enlarged sectional view of a construction showing the relations between the oscillating arm type parallel cylindrical rollers and the transmission axles as shown in FIG. 1.

For the convenience of understanding, reference can be made to FIGS. 2 and 3, wherein FIG. 2 shows a partially enlarged sectional view of the constructional relations between transmission axles 44 and clamp type oscillating arm cylindrical rollers 42 and FIG. 3 is an enlarged sectional view in details of the movable clamp type knife tools 43.

An umbrella gear wheel 45 and a supporting seat 46 are installed at a suitable location on each of the transmission axles 44 as shown in FIG. 2. The cylindrical roller 42 is made of a light material (such as aluminum alloy) and is provided with a covering made of a material with high resistive coefficient (such as rubber layer). To the upper part of a cylindrical roller 42, there is secured an arm extension 47, the upper part of which passes through a narrow opening 70 at the bottom of supporting seat 46 and is connected to an umbrella gear wheel 49 operatively meshed with the umbrella gear wheel on the transmission axle 44. The arm extension 47 is placed inside a protecting tube 54. On one end of the transmission axle 44 is provided a chain wheel 50 connected by means of a chain 51 to the chain wheel 53 mounted on the speed reducing means 52 driven by a driving motor 54, thus the motor 54 is capable of making the cylindrical rollers rotate in the direction of the arrow. In addition, on the same position of the two transmission axles 44 are provided cylindrical rollers 42 in parallel and the upper part of the arm extension 47 passes through the bottom part of supporting seat 46 and is operatively engaged with the transmission axle 44 by means of umbrella gear wheels 45 and 49. The air gap between the two cylindrical rollers in parallel is approximately 5 mm (smaller than the outside diameter of asparagus) and the two cylindrical rollers in parallel spin in the opposite direction (as shown in FIGS. 1 and 2). With this construction, the end tip of asparagus advances by means of the V-shaped belts 32 to the air gap between cylindrical rollers 42, and then the husk of asparagus end tip comes into contact firstly with cylindrical rollers 42. The asparagus is then brought into the air gap by the contact friction force developed by the cylindrical rollers 42 and each of the cylindrical rollers 42 is pushed slightly outward respectively due to the proper angular pendulum action of supporting seat 46 which pivots by means of bearing 48 around the transmission axle 44. In addition, on protective tube 54 is provided a restoring spring 55 which enables the two cylindrical rollers 42 to advance asparagus and hold asparagus as well, thereby the end tip of asparagus being pushed through the gap between the first set of the parallel cylindrical rollers into the gap between the adjacent second set of parallel cylindrical rollers 42b. As previously described, each of the second parallel cylindrical rollers 42b is then slightly pushed outward respectively and clamps the asparagus and pushes it in the forward direction. After the end tip of asparagus passes through the two parallel cylindrical rollers 42b, the asparagus advances to the clamp type knife tools 43 having an opening and closing action located in the rear of the cylindrical rollers 42b. The clamp type knife tools 43 driven by either air pressure or electrical means clamp the asparagus body securely and peel both sides of the asparagus husk by the proper width as the asparagus is being pushed continuously through the first and second set of cylindrical rollers and knife tools. In the same manner, the partially peeled asparagus then advances to the third set of cylindrical rollers (not shown in the drawing) located directly behind the knife tool. As afore-mentioned, after passing through the second set of cylindrical rollers (not shown in the drawing), the asparagus is clamped and peeled by the second set of clamp type knife tool (not shown in the drawing) which is so arranged that its angle of installation is different from that of the afore-mentioned knife tool 43, thereby peeling a different portion of asparagus husk. Thus the asparagus moving through several sets of cylindrical rollers and clamp type knife tools constructed in accordance with the invention has been completely peeled and comes out of the product guideways 56.

Figure 4:
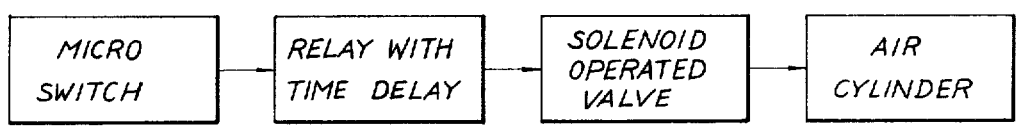
FIG. 4 is a block diagram of operation for controlling an air cylinder equipped with a micro-switch.
Figure 5:
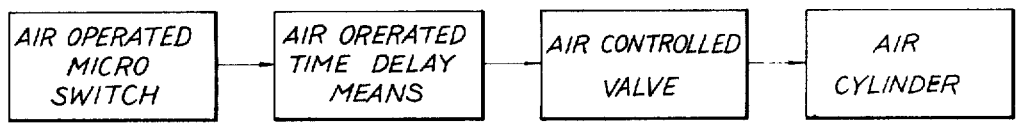
FIG. 5 is a block diagram of another method for controlling the opening and closing operation of the knife tool arm extension assembly as shown in FIG. 1.

FIG. 3 shows two clamp type knife tools each of which is secured to the forward end portion of a hollow arm extension 57, another end of which is situated in the concave guideway 59 of a fastening plate 58, thereby permitting both of the arm extensions to make a certain degree of opening and closing movement. On the inside surfaces of the knife tools situated at the forward end portion of arm extensions 57 are several water nozzles 60 and to a suitable location of extension arm 57 is secured a flexible water tube 61 supplying water to the water nozzles 60 for removing the remains on the knife tools. A transmission rod 62 is provided on each of two arm extensions 57, and the other ends of the transmission rods are connected to the upper end of a piston rod 64 of an air cylinder 63. The movement of the piston rod 64 is controlled by a micro-switch 65 installed on the odd-numbered set of parallel cylindrical rollers protecting tubes 54. In other words, when two parallel cylindrical rollers are pushed slightly outward permitting the micro-switch to be free from depression and form a closing position, the air cylinder 63 is filled up with air thus pushing the piston rod 64 upward. The arm extensions 57 are then pushed inward by means of the transmission rod 62 thus enabling the knife tools 43 to hold asparagus for peeling its husk. After asparagus passes completely through the front set of odd-numbered parallel cylindrical rollers, the two cylindrical rollers restore to the original position by means of restoring spring 55 whereby permitting the micro-switch to be depressed and form an opening position, and thus the air in air cylinder 63 is discharged and arm extensions 57 are pulled outward by means of the spring 66 permitting the piston rod 64 to move downward. The fastening plate 58 can be secured to the inside surface in response to the shape of inside surface of the enclosure 41. As the art of controlling an air cylinder by means of a micro-switch is well known to those familiar with mechanical and electrical engineering, the block diagrams as shown in FIGS. 4 and 5 are disclosed as as example for the explanation of two implementation methods without further description. Furthermore, the knife tools 43 formed on the forward end portion of arm extensions 57 are adjustable up to the range of approximately 30 degrees in angle displacement so as to respond to different shape and size of asparagus.

For purpose of permitting asparagus to readily pass through the gap between parallel cylindrical rollers, in front of each of odd-numbered parallel cylindrical rollers is provided a horn-shaped material guide plate inlet 676 which is tapered outward by approximately 60 degrees. One material guide plate inlet is situated at the inlet opening in front side of the enclosure 41 and the other material guidance plate inlets are secured to the upper portion of the inside surface of enclosure 41. To remove the remains flushed down by water, a tapered outlet is provided (not shown in the drawing) in the bottom portion of enclosure 41.

Most important and also one of the noblest features of the invention is the parallel cylindrical rollers, the upper end of arm extension 47 of which being not fastened, that are capable of holding and advancing asparagus but also capable of oscillating without damaging the asparagus along the outside dimension of asparagus as in the case in dealing with bent asparagus.

In this embodiment, the clearance between the front and the following set of parallel cylindrical rollers is 10 mm, and the diameter of cylindrical roller is 38 mm due to the fact that the tip end of asparagus, generally 38 mm in diameter, must not be peeled or otherwise damaged readily. The clearance between the clamp type knife tools and the even-numbered parallel cylindrical rollers is 20 mm, and the spinning speed of cylindrical rollers is approximately 238 RPM. A timer or other kind of means such as relays capable of operating with time delay characteristics in connection with a micro-switch can be employed to control the air cylinder 63 in such a way that the clamp type knife tools start holding securely both sides of asparagus only when the asparagus body passes by a certain length through the second parallel cylindrical rollers, that is to say, when the end tip of the asparagus has already passed through the knife tools so as to avoid a damage to itself.

It goes without saying that asparagus may be peeled without having to completely pass through the two sets of parallel cylindrical rollers. In other words, it is possible that a single set of knife tools can be placed behind each set of cylindrical rollers, depending on mechanical engineer's intention.

In this embodiment of the invention, the machine can peel 120 pieces of asparagus, twice as many as that of conventional methods (about 60 pieces per minute) which require operators to adjust and hold the end tip of asparagus before going through mechanical peeling process. Furthermore, it needs only a single operator to simultaneously control two to four sets of the machines constructed in accordance with the invention, while two to four operators are needed to operate even one set of conventional machine. It is to be noted that the invention can save a great deal of labor cost, and is of great value in this industry.

While the invention has been described in its preferred embodiments, it is to be understood that the words which have been used are words of description rather than limitation and that changes within the purview of the following claims may be made without departing from the true scope and spirit of the invention in its broader aspects.

What is claimed is:

1. An automatic asparagus peeling machine comprising:

vibrating type feeding means;

parallel guide means adapted to transport single stalks of asparagus transversely in parallel alignment from said feeding means;

conveying means which receive individual stalks of asparagus sequentially from said parallel guide means and which transport the stalks linearly in a transverse direction away from said parallel guide means; and an automatic peeling assembly, including:

multiple guide entry means;

several pairs of vertical cylindrical rollers, aligned in parallel so as to form two files, each such roller being driven by a shaft which is adapted to swing in a pendulum fashion, said shaft being housed in a protective tube, each said pair of rollers being joined by resilient means connected to said protective tube so as to weakly bias the rollers of a pair against spreading apart beyond an initially fixed gap, and each of said rollers in said pairs being independently driven so as to rotate in opposite directions, thereby providing a linear transporting force to stalks of asparagus which enter therebetween, the combination of said resilient bias and said pendulum action being selected to avoid crushing the stalks, all said pairs of rollers being commonly driven;

knife tool means mounted upon multiple pairs of opposed swinging arms, which arms align knives with the said files of said rollers when in peeling position and which said arms are biased to swing outwardly so as to separate the knife tools by a distance which is large compared to the diameter of asparagus stalks when said arms are in an open position; and an enclosure, surrounding the peeling assembly and to which the said cylindrical roller pairs, said knife tool means, and said guide entry means are assembled, and where said conveying means delivers the asparagus stalks to the first of said guide means, said first guide means directing the stalks to the first of said pairs of rollers, other guide means being placed before subsequent pairs of rollers.

2. An automatic asparagus peeling machine as defined in claim 1, wherein said parallel guide means further comprises:

multiple parallel flat plates, mounted in guideways in an essentially upright orientation and assembled contiguously so as to slide adjacent to each other in said guideways, each said plate having a cylindrical bevel on its upper edge, with said bevel facing said conveyor; and a cam shaft, mounted below and parallel to the assembly of said plates and having a cam lobe for each of said plates, each said cam lobe being substantially different in phase from its neighbors so as to cyclically raise alternate ones of said plates while lowering the neighboring plates as the cam shaft 15 rotated, providing an advancing profile to the upper edges of said plates.

3. An automatic asparagus peeling machine as defined in claim 1, wherein said conveying means comprise:
two flat belts, operating in a parallel direction and driven at the same linear speed, and wherein the planes of the belts are tilted toward each other so as to form a V-shaped conveying passage.

4. An automatic asparagus peeling machine as defined in claim 1, wherein:
the said protective tubes which house the shafts driving said cylindrical rollers are provided with a microswitch which is normally open when the said rollers are spaced at the initially fixed gap, the switch being closed when said rollers are forced apart by stalks which enter between said rollers;
a solenoid valve is operated by said microswitch so as to permit air flow when controlled by said microswitch; and
a pneumatic cylinder is linked to said knife tool swinging arms, said cylinder being driven by the air flow from said solenoid valve so as to move said knife tools to the peeling position when said switch is closed through separation of the said rollers and to separate the knife tool means when no asparagus stalks are present between said rollers.

5. An automatic asparagus peeling machine as defined in claim 4 wherein:
the first of said pairs of knife tools is located between the first and second pairs of said rollers as measured from the inlet with additional pairs of said knife tools after the third and each subsequent odd-numbered pair of rollers;
said guide entry means has the form of a tapered horn;
said guide entry means between said pairs of rollers are located following each even-numbered pair of rollers as measured from the entry, so as to guide the stalks leaving the preceding even-numbered rollers into the following odd-numbered rollers; and
said knife tool swinging arms are pivotally guided in concave guideways mounted on said enclosure.

6. An automatic asparagus peeling machine as defined in claim 4, further comprising washing means for removing debris on said knife tools, and wherein:
said swinging arms upon which the knives are mounted are hollow and are provided with washing nozzles adjacent to the said knife tools; and
said hollow swinging arms are provided with a washing water supply through individual flexible hoses.

7. An automatic asparagus peeling machine as defined in claim 1, wherein said gap between said parallel cylindrical rollers is smaller than the average diameter of asparagus.

8. An automatic asparagus peeling machine as defined in claim 17, wherein said arm extensions of said knife tools have four restoring springs for pushing said arm extensions outward when said air cylinder discharges air and loses pressure.

* * * * *